(12) United States Patent
Jacob

(10) Patent No.: US 6,241,617 B1
(45) Date of Patent: Jun. 5, 2001

(54) PROPELLER SHAFT ASSEMBLY FOR A MOTOR VEHICLE ESPECIALLY A PASSENGER CAR

(75) Inventor: Werner Jacob, Frankfurt (DE)

(73) Assignee: GKN Lobro GmbH (DE)

( * ) Notice: Subject to any disclaimer, the term of this patent is extended or adjusted under 35 U.S.C. 154(b) by 0 days.

(21) Appl. No.: 09/350,720

(22) Filed: Jul. 9, 1999

(30) Foreign Application Priority Data

Jul. 10, 1998 (DE) .............................................. 198 31 016

(51) Int. Cl.$^7$ ....................................................... F16C 3/03
(52) U.S. Cl. ............................ 464/167; 464/179; 464/906
(58) Field of Search ................................... 464/141, 145, 464/162, 167, 168, 179, 180, 904, 905, 906

(56) References Cited

U.S. PATENT DOCUMENTS

| | | | |
|---|---|---|---|
| 5,582,546 | * 12/1996 | Welschof | 464/141 |
| 5,611,733 | 3/1997 | Jacob et al. | |
| 5,634,853 | * 6/1997 | Smith | 464/162 |
| 5,813,917 | * 9/1998 | Wakamatsu et al. | 464/906 X |
| 5,899,814 | * 5/1999 | Murillo | 464/145 X |

FOREIGN PATENT DOCUMENTS

| | | |
|---|---|---|
| 2 212 882 | 2/1989 | (GB) . |
| 2 289 929 | 6/1995 | (GB) . |
| 2 311 758 | 8/1997 | (GB) . |
| 2 311 117 | 9/1997 | (GB) . |

OTHER PUBLICATIONS

Pro. Dipl.–ing Jörnson Reimpell: Fahrwerktechnik 1, 5th Edition, Vogel–Verlag, p. 285, Figure 3.1/21.

* cited by examiner

Primary Examiner—Lynne H. Browne
Assistant Examiner—Greg Binda

(57) ABSTRACT

The invention relates to a propeller shaft assembly for connecting the front gearbox output to the drive input of a rear axle drive of a passenger car. Said propeller shaft assembly comprises at least two propeller shaft portions 9, 10. Both are supported by an intermediate bearing 11 arranged in the connecting region. At the gearbox output end, there is provided a first joint 12. In the connecting region between the two propeller shaft portions 9, 10, there is provided a third joint 14. All joints 12, 13, 14 are provided in the form of constant velocity fixed joints. Additionally, towards the ends, there is provided a plunging element 16, 30 which is provided in the form of a rolling contact member guide which rollingly permit displacements along the longitudinal axis 32 and which additionally effect the transmission of torque. This assembly prevents any vibrational excitement either at the gearbox output end or at the axle drive end from reaching the propeller shaft assembly. As a result, the intermediate bearing 11 is not affected by vibrations. In this way, there are achieved quiet running characteristics, and any noise in the form of structure-borne sound is not transmitted.

4 Claims, 4 Drawing Sheets

PROPELLER SHAFT ASSEMBLY FOR A MOTOR VEHICLE ESPECIALLY A PASSENGER CAR

BACKGROUND OF THE INVENTION

The invention relates to a propeller shaft assembly for connecting the front gearbox output to the drive input of the rear axle drive of a motor vehicle, especially of a passenger car.

Such propeller shaft assemblies known from the technical literature, for example Prof. Dipl.-Ing. Jörnson Reimpell: Fahrwerktechnik 1, $5^{th}$ edition, Vogel-Verlag, p. 285, FIG. 3.1/21, comprise two propeller shaft portions which are connected to one another by a constant velocity plunging joint. At the ends of the propeller shaft portions intended to be connected to the front gearbox output and to the rear drive input, there are arranged universal joints. The propeller shaft serving to be connected to the gearbox output is associated with a resilient intermediate bearing which serves for additionally supporting the propeller shaft assembly on the floor assembly of the motor vehicle. The connection at the front end between the universal joint and the gearbox output is effected by a sleeve which is associated with a joint yoke of the universal joint and which comprises a bore with longitudinal toothing by means of which it is slid onto a correspondingly toothed shaft in the neck of the gearbox output. The constant velocity plunging joint connecting the two propeller shaft portions permits angular movements as well as displacing movements between the inner joint part and the outer point part, so that any changes in distance and position between the intermediate bearing and the rear drive input are compensated for. However, the resistance against such displacement is high.

In the assembly described, the smooth running characteristics are improved as compared to those propeller shaft assemblies wherein the between the two propeller shaft portions is a universal joint, but any movement vibrations generated by the gearbox, by the axle drive of the rear axle and resulting from the displacement of the articulation center of the universal joint, are transmitted by the front and rear propeller shaft portions into the attached assemblies. The intermediate bearing is also excited by vibrations.

The propeller shaft assembly is subject to movement vibrations and structure-borne sound vibrations introduced by the gearbox output and the rear drive input. In addition, as far as the rear propeller shaft portion is concerned, there are temporarily increased articulation angles. The problem is that constantly changing torque values and rotational speeds are transmitted from the front engine and gearbox unit to the rear axle. Load values suddenly increasing to 10 times the nominal torque, and rotational speeds up to 10,000 revolutions per minute are no rarity.

SUMMARY OF THE INVENTION

It is an object of the invention to propose a propeller shaft assembly which largely disconnects any vibrations introduced in the longitudinal direction and which, itself, does not generate any rotational vibrations.

In accordance with the invention, the objective is achieved by providing a propeller shaft assembly for connecting the front gearbox output to the drive input of the rear axle drive of a motor vehicle, such as a passenger car. The assembly includes a joint at each end for providing a connection to the front gearbox output and to the rear drive input, and includes plunging elements arranged near the joints to be connected to the front gearbox output and to the rear drive input. The plunging elements are provided in the form of a rolling contact member guide which permits plunging movements along a longitudinal axis and effect the transmission of torque. All of the joints are provided in the form of constant velocity fixed joints which only permit angular movements.

The advantage of the present embodiment is that any vibrations which can be transmitted by the front gearbox or by the rear axle drive into the propeller shaft assembly, and thus into the intermediate bearing, can be disconnected close to the vibration generating elements. There exist floating centering conditions.

According to a further embodiment, there are provided at least two propeller shaft portions, at least one intermediate bearing and one constant velocity fixed joint at each end for providing a connection to the front gearbox output and to the rear drive input, and one such joint between the two adjoining propeller shaft portions. Furthermore, the plunging elements are associated with the front propeller shaft portion and the rear propeller shaft portion. It is thus possible to keep the intermediate bearing largely free from vibration loads. This means that the intermediate bearing can be designed more easily for damping radial vibrations.

A particularly advantageous way of arranging the plunging elements consists in integrating same into the inner parts of the constant velocity fixed joints associated with the front gearbox output and the rear drive input.

According to a further embodiment of the invention, it is proposed that the joints each comprise an outer part with a cavity and two circumferentially distributed sets of outer running grooves which extend from the two open ends of the outer part in opposite directions in an undercut-free way in meridian planes around the longitudinal axis of the outer part. The inner part arranged in the cavity of the outer part is provided with inner running grooves which are arranged in accordance with the outer running grooves and which, like the outer running grooves, start from the same open ends and extend in an undercut-free way in meridian planes around the longitudinal axis. Between the outer part and the inner part, there is arranged a joint cage whose windows are open towards the outer running grooves and the inner running grooves. Said windows accommodate joint balls of which one each is arranged in a pair of outer and inner running grooves.

Said constant velocity fixed joints are advantageous in that they run in a low-friction way and even at larger articulation angles, they have a long service life. In particular, this is the case if, per type of running groove, there are used at least five balls, i.e., a total of at least ten joint balls. The running characteristics are then smoother, too, because the mass of said joint balls is much smaller than in the case of the usual joints which are provided with six balls. Furthermore, the torque transmitting capacity is improved at higher articulation angles because more balls participate in the transmission of torque. Smooth running characteristics are particularly important when using such joints in the propeller shaft of a passenger car where high rotational speeds occur.

BRIEF DESCRIPTION OF THE DRAWINGS

A preferred embodiment of the invention is diagrammatically illustrated in the drawings wherein.

DETAILED DESCRIPTION OF THE PREFERRED EMBODIMENT

Figure 1:
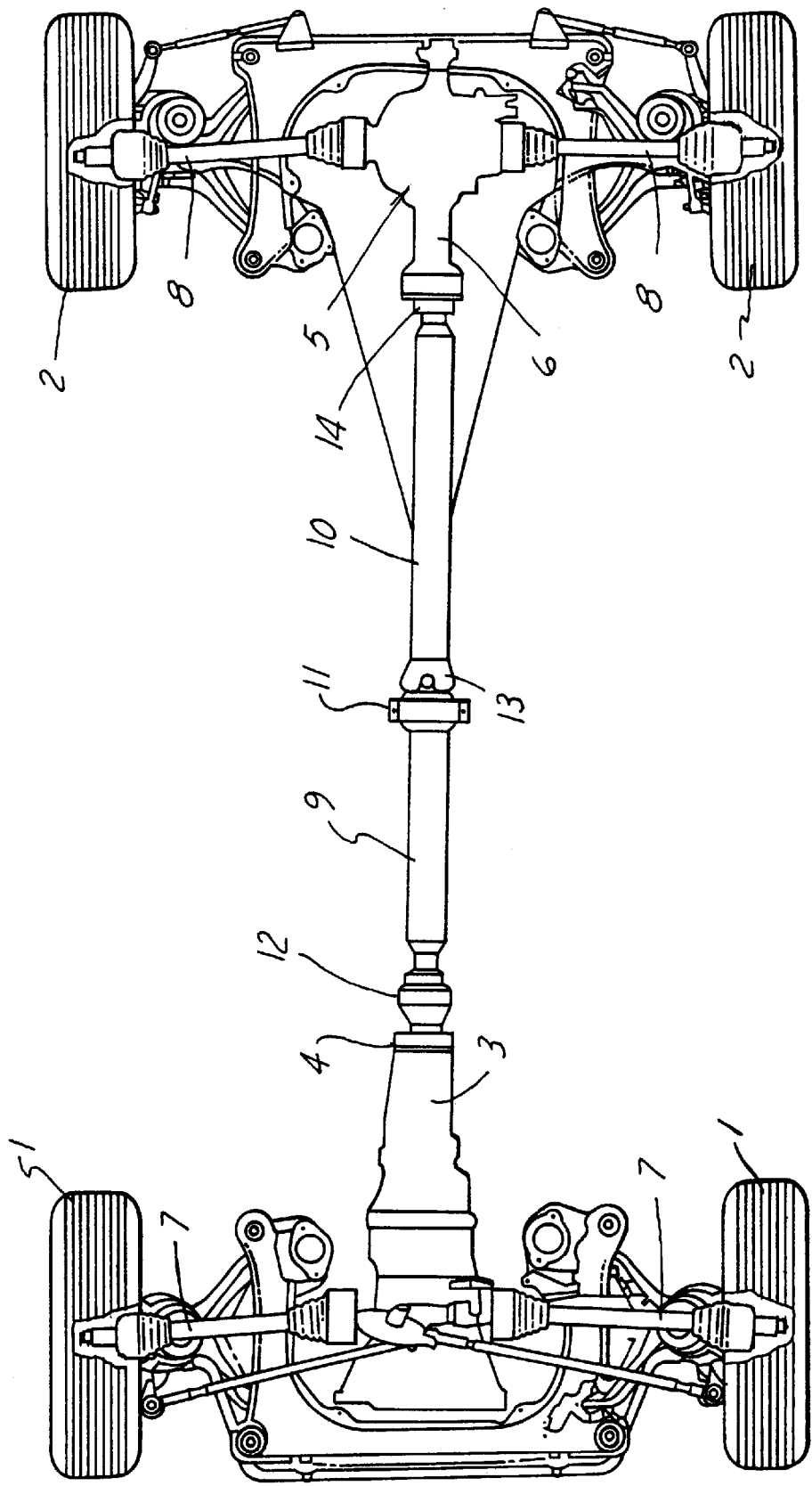
FIG. 1 is a diagrammatic illustration of a driveline of a passenger car, having a propeller shaft assembly in accordance with the invention.

FIG. 1 shows the driveline for a four-wheel drive vehicle. The two front wheels 1 and the two rear wheels 2 are driven. FIG. 1 also shows the gearbox 3 with the gearbox output 4. In the region of the rear axle, there is provided the axle drive 5 with the drive input 6. The two front wheels 1 are driven by sideshafts 7. The two rear wheels 2 are driven by the sideshafts 8, starting from the axle drive 5. The connection between the gearbox 3 and the axle drive 5 is provided by a propeller shaft assembly in accordance with the invention which comprises two propeller shaft portions 9 and 10. The propeller shaft assembly is additionally supported on the floor assembly of the vehicle by an intermediate bearing 11 which is arranged approximately centrally.

In the first propeller shaft portion 9, the propeller shaft assembly comprises a first joint 12 in the form of a constant velocity fixed joint arranged near the gearbox output 4. For connecting the two propeller shaft portions 9, 10, there is provided a second joint 13 in the form of a constant velocity fixed joint. At the end of the second propeller shaft portion 10, there is arranged a third joint 14 in the form of a constant velocity fixed joint which, via connecting means, is connected to the drive input 6 of the axle drive 5 in the region of the rear axle. In most applications, the propeller shaft portions 9, 10 rotate at a speed which is higher than the speed introduced by the engine into the manual or automatic gearbox. The reduction to the speed of the rear wheels 2 takes place in the axle drive 5. Whereas, for example, the propeller shaft assembly with the propeller shaft portions 9, 10 and the associated joints 12, 13, 14 have to rotate at speeds of up to 10,000 revolutions per minute, the speeds of the sideshafts 8 for driving the rear wheels 2 reach approximately up to 2,500 revolutions per minute.

Figure 2:
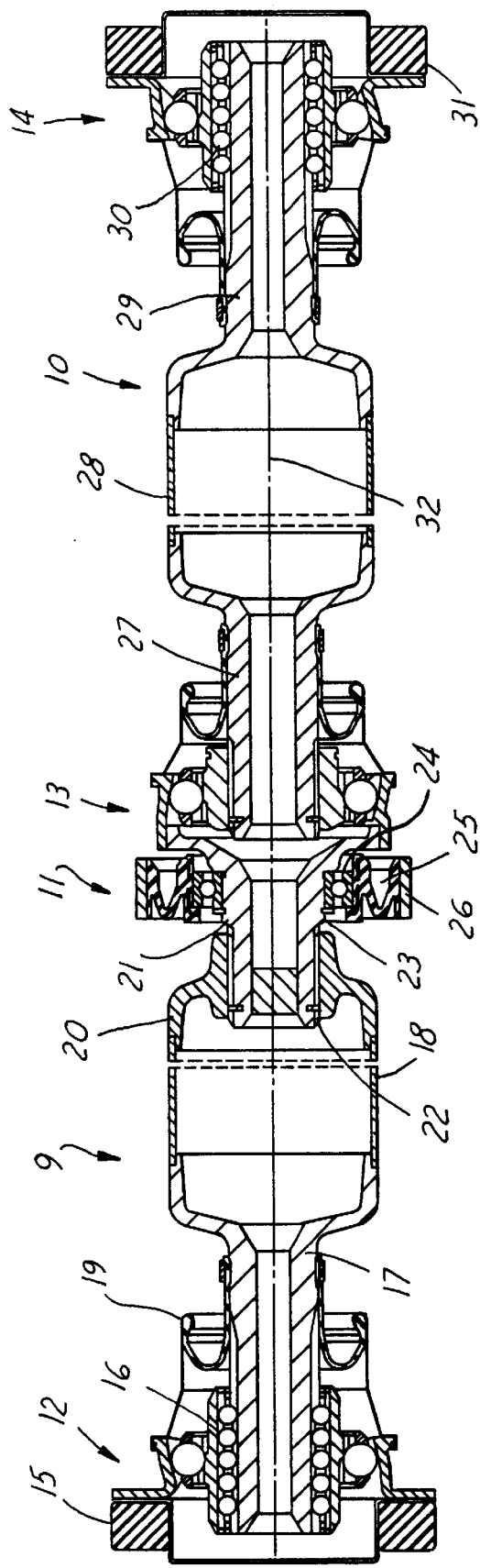
FIG. 2 shows a propeller shaft assembly in a scale which is enlarged as compared to FIG. 1, with all components being aligned relative to one another.

FIG. 2, in an enlarged scale, show an inventive propeller shaft assembly in a longitudinal section. All its components are shown to be aligned along a common longitudinal axis 32.

Figure 4:
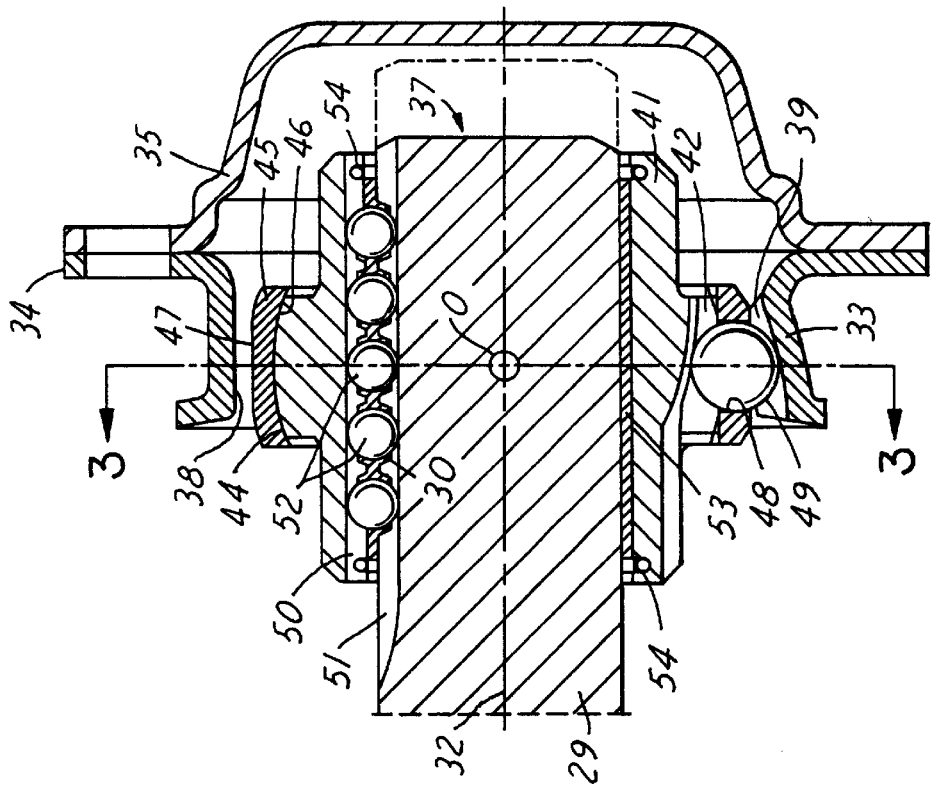
FIG. 4 is a longitudinal section through the rear constant velocity fixed joint according to FIG. 3 along the sectional line IV—IV of FIG. 3.

On the left, there is shown the first joint 12 in the form of a constant velocity fixed joint which will be described in greater detail with reference to FIGS. 3 and 4. The joint comprises an outwardly directed flange by means of which the outer part of the joint 12 is connected to the gearbox output 4 shown in FIG. 1, with a damping element 15 being arranged therebetween. In this embodiment, the damping element 15 consists of a material whose modulus of elasticity deviates from that of the joint 12.

Into the inner part of the joint 12, there is inserted a first plunging element 16 in the form of a rolling contact member guide. The balls of said first plunging element 16 are guided in the inner plunging grooves of a first plunging journal 17. Furthermore, the first joint 12 is closed by a sealing sleeve 19 which may be associated with a cap for example which is connected to the outer part of the joint 12. The small diameter of the sealing sleeve 19 is connected to the first plunging journal 17. The first plunging journal 17, away from the joint 12, comprises a widened region to which a first tube 18 is connected. Said first tube 18, in turn, is connected to attaching means of a sleeve 20 which comprises a toothed bore. Via toothing 22, a first journal 21 is connected to the sleeve 20 in a rotationally fast way. The first journal 21 comprises a bearing seat 23 and a flange portion. The above-mentioned components are associated with the first propeller shaft portion 9.

The inner ring of a rolling contact bearing 24 is held on the bearing seat 23. The outer ring of the rolling contact bearing 24 is connected to a damping element 25 received in a housing 26. Said components form the intermediate bearing 11. The housing 26 is to be secured to the floor assembly of the passenger car.

At the end of the flange of the first journal 21, which end faces away from the propeller shaft portion 9, there is connected the outer part of the second joint 13 provided in the form of a constant velocity fixed joint. A second journal 27 is connected to the inner part of the second joint 13 by a set of toothing. The second journal 27, away from the second joint 13, comprises a widened region to which there is welded a second tube 28 whose other end is welded to a widened portion of the second plunging journal 29.

The second plunging journal 29, by means of balls of a second plunging element 30, is connected in a rotationally fast way to the inner part of the third joint 14 provided in the form of a constant velocity fixed joint. The plunging element 30 is provided in the form of a rolling contact member guide.

The outer part of the third joint 14 is connectable via a second damping element 31 to the drive input 6 of the rear axle drive 5 by means of a flange connection.

By arranging the plunging elements 16, 30 near the ends of the two propeller shaft portions 9, 10 it is ensured that any vibrations originating from the gearbox 3 and axle drive 5 according to FIG. 1 and acting on the first joint 12 and the third joint 14 respectively in the direction of the longitudinal axis 32 cannot be passed onto the propeller shaft assembly and, thus, not into the intermediate bearing 11. The two propeller shaft portions 9 and 10 are held and centered by the intermediate bearing 11 in the direction of the longitudinal axis 32.

FIG. 2 shows all components in the aligned position. Under normal installation conditions, the position of the gearbox output deviates from that of the intermediate bearing 11 and of that of the drive input of the axle drive, so the joints 12, 13, 14 operate at an articulation angle. In particular, this is the case in the region of the second propeller shaft portion 10, with the two joints 13, 14 compensating for angular movements carried out in the region of the rear axle as a result of the axle drive, i.e., the position of its drive input relative to the intermediate bearing 11. Because the plunging elements 16, 30 are designed as rolling contact member guide, it is possible to achieve a particularly low-friction connection which does not pass on the vibrations in the direction of the longitudinal axis. There is thus achieved particularly smooth running characteristics. However, smooth running is also influenced by the design of the joints 12, 13, 14. In principle, they are of identical design, but the second joint 13 differs from the first joint 12 and the third joint 14 in that it is not associated with an additional plunging element. The joints 12 and 14 are substantially of identical design. There may be variations in the region of the connections. The design of said joints 12, 14 will now be explained in greater detail with reference to the third joint 14, also in respect of the integration of the plunging element 30, by referring to FIGS. 3 and 4.

The design of the third joint 14 and of the second plunging element 30 integrated into same will be described jointly with reference to FIGS. 3 and 4.

The third joint 14, provided in the form of a constant velocity fixed joint, comprises the outer part 33 formed as a plate metal part from a circular blank or a tube, and a flange 34 to be connected either to the gearbox output or to the axle drive input. Between the two open ends 36, 37, the outer point part 33 is provided with a continuous space which at one end, at the end 37, is closed by the cap 35. The cap 35 comprises a flange which is designed identically to the flange 34, and rests on the flange 34 and is connected thereto. The inner face 38 is provided with circumferentially distributed first outer running grooves 39 and second outer running grooves 40, which alternate on the circumference around the longitudinal axis 32. They are arranged in planes which are distributed around the longitudinal axis and contain same. The first outer running grooves 39 extend in the respective associated plane in a curve-like and undercut-free way, starting from the first open end 36. The second outer running grooves 40 arranged between two first outer running grooves 39 start from the second open end 37 and extend in meridian planes with reference to the longitudinal axis 32 in a curve-like and undercut-free way towards the first open end 36. The first outer running grooves 39 and the second outer running grooves 40 are formed into the outer part 33 formed from a plate metal sheet or from a tube.

Furthermore, the third joint 14 comprises an inner part 41 whose outer face 44, which is spherical with reference to the joint center O, is provided with formed-in first inner running grooves 42 and second inner running grooves 43. The first inner running grooves 42 start from the first open end 36 and extend towards the second open end 37 of the outer part 33 in an undercut-free and curve-like way and are arranged in meridian planes with reference to the longitudinal axis 32 so as to be positioned opposite the second outer running grooves 40.

Between the inner face 38 of the outer part 33 and the outer face 44 of the inner part 41, there is arranged a joint cage 45. The joint cage 45 comprises a hollow-sperical inner cage face 46 by means of which the cage 45 is guided on the spherical outer face 44 of the inner part 41. The outer cage face 47 is arranged at a distance from the inner face 38 of the outer part 41.

Between the inner cage face 46 and the outer cage face 47, there are provided windows 48 which are circumferentially distributed and arranged in accordance with the pairs of first outer running grooves 39 and first inner running grooves 42 as well as pairs of second outer running grooves 40 and second inner running grooves 43. Said windows 48 contain joint balls 49 whose centers are arranged in one plane which contains the joint center O. The joint balls 49 project radially outwardly beyond the outer cage face 47 and radially inwardly beyond the inner cage face 46 and engage the associated opposed first outer running grooves 39 and first inner running grooves 42 as well as second outer running grooves 40 and second inner running grooves 43 for torque transmitting purposes. They are held by the joint cage 45 in the angle-bisecting plane when the outer part 33 is articulated relative to the inner part 42 and guided into said plane as a result of the shape relative to the inner part 42 and guided into said plane as a result of the shape of the running grooves.

The inner part 41 and the outer part 33, additionally, are nondisplaceable in the direction of the longitudinal axis 32.

This results from the running grooves which extend in opposite directions and are provided in the form of the two sets of first outer running grooves 39 and first inner running grooves 42 as well a second outer running grooves 40 and second inner running grooves 43, in connection with the joint cage 45 being guided on the inner part 41. In other words, the inner part 41 and the outer part 33 are held and centered on the articulation center O.

Figure 3:
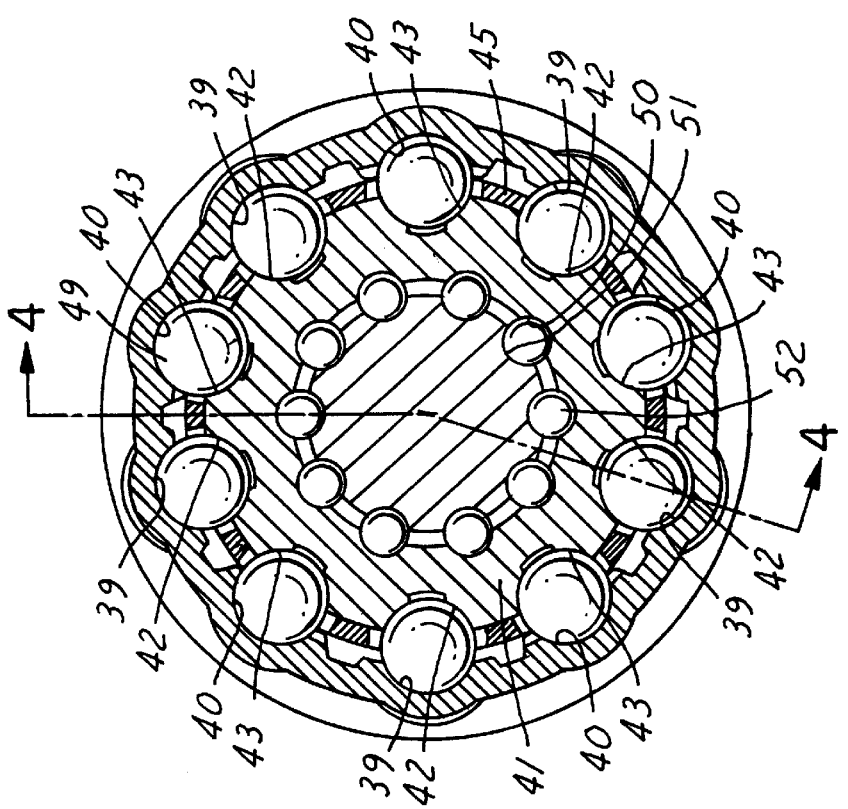
FIG. 3 is a section along line III—III according to FIG. 4 through a constant velocity fixed joint arranged towards the rear drive input.

FIG. 3 shows that one pair each of a first outer running groove 39 and a first inner running groove 42 alternates on the circumference with a pair of a second outer running groove 40 and a second inner running groove 43 and that, in total, there are provided five such pairs of running grooves. In this embodiment, a total of ten joint balls 52 participates in the transmission of torque.

In addition, the inner part 41, at both ends, is increased in length sleeve-like beyond the portions containing the first and second inner running grooves 42, 43. The inner part 41 comprises a continuous bore in which there are arranged outer plunging grooves 50 which are circumferentially distributed around the longitudinal axis 32. The grooves 50 are associated with the second plunging element 30 and extend parallel to the longitudinal axis 32. Balls 52 are held in said outer plunging grooves 50 by a plunging cage 53 so as to roll along the longitudinal axis 32, with the rolling movement being limited by stop rings 54 at the ends. The rolling movement is limited in that the balls 52 arranged at the ends come to rest against one of the stop rings 54, thus limiting the axial movement of the plunging cage 53 in the inner part 41. Each of the outer plunging grooves 50 contains a plurality of balls 52 arranged one behind the other.

The second plunging journal 29 extends into the plunging cage 53 and comprises inner plunging grooves 51 which are distributed around the longitudinal axis 32 in accordance with the outer plunging grooves 50 and which are engaged by the balls 52 to effect a transmission of torque between the second plunging journal 29 and the inner part 41.

With reference to the longitudinal axis 32, the inner plunging grooves 51 are longer than the outer plunging grooves 50. The maximum amount by which the second plunging journal 29 can be inserted into the inner part 41 is illustrated in FIG. 4 in dash-dotted lines. Of course, the plunging elements described can also be arranged near the joints to be connected to the front gearbox output 4 and to the rear drive input 6, rather than partly integrated into the inner part 41 as described. Thus, the plunging elements could be arranged toward the input of the rear drive 6 and the gearbox output 4, or between the constant velocity fixed joints 12, 13, 14 and the propeller shaft portions 9, 10.

In operation, the outer part 33 experiences vibrations from the axle drive, for example, and which extend in the direction of the longitudinal axis 32. As a result of the plunging element 30 in the form of the rolling contact member guide, however, said vibrations are not passed onto the second plunging journal 29. In practice, the vibrations introduced into the outer part 33 are disconnected from the remaining part of the second propeller shaft portion 10 and thus also from the first propeller shaft portion 9, so that the intermediate bearing 11 remains unaffected by any vibrations in the direction of the longitudinal axis 32.

Figure 5:
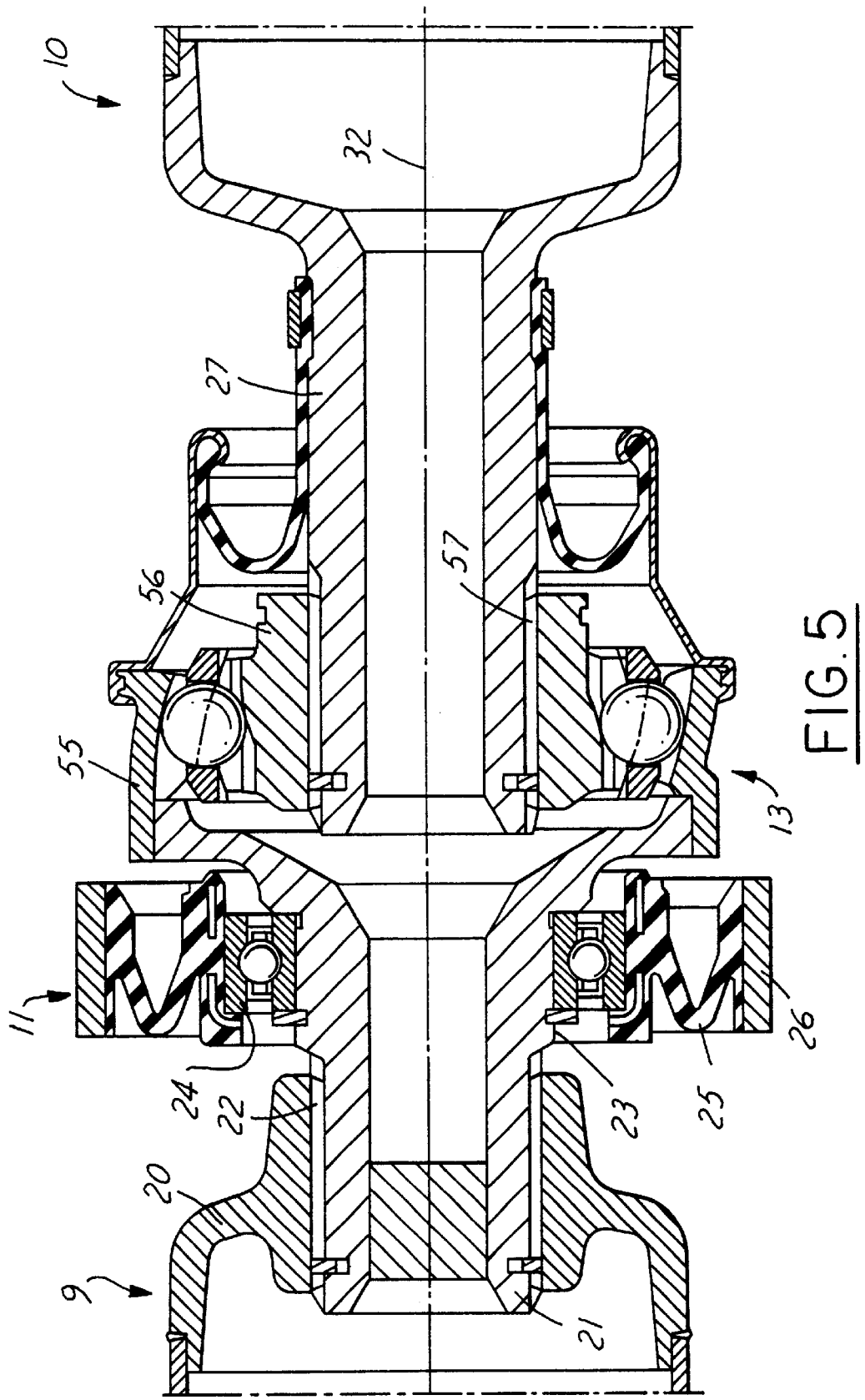
FIG. 5 is a longitudinal section through the intermediate bearing and the constant velocity fixed joint adjoining same, with the components being in the aligned position relative to one another, i.e., all components have the same longitudinal axis in common.

FIG. 5 shows the assembly in the region of connection between the two propeller shaft portions 9 and 10. It is possible to identify the way in which the sleeve 20 associated with the first propeller shaft portion 9 is connected by toothing 22 to the first journal 21. It is also possible to see the cylindrical bearing seat 23. The inner ring of the rolling contact bearing 24 is positioned on said bearing seat 23 and axially held between a shoulder in the region of transition to the flange-like shape of the first journal 21 and a securing ring. It can also be seen that the outer bearing ring of the rolling contact bearing 24 is provided with a damping element 25 which, in turn, on its outer circumference, is secured in a housing 25 made of metal. The damping element 25 is preferably designed to dampen radial vibrations in respect of the longitudinal axis 32. It is practically not subjected to any excitation in the direction of the longitudinal axis 32 because no axial vibrations can be introduced as a result of the two plunging elements described in connection with FIG. 2.

Furthermore, in the region of connection between the two propeller shaft portions 9, 10, there is provided a second joint 13 in the form of a constant velocity fixed joint which, in respect of its design principle regarding the way in which the running grooves extend and are arranged, corresponds to the embodiment of the third joint 14 as described. The outer joint part 55 of the second joint 13 is firmly connected to the flange-like enlargement of the first journal 21. The inner joint part 56 of the second joint 13 is axially firmly connected in a rotationally fast way to the second journal 27 by toothing 57. No plunging element is provided in the region of the second joint 13.

What is claimed is:

1. A propeller shaft assembly for connecting the front gearbox output (4) to the drive input (6) of the rear axle drive (5) of a motor vehicle, the assembly comprising:

a first joint (12) at one end of the propeller shaft assembly for providing a connection to the front gearbox output (4) and a second joint (14) at another end of the propeller shaft assembly for providing a connection to the rear drive input (6), said joints (12, 14) being constant velocity fixed joints which only permit angular movements; and a first plunging element (16) arranged near the first joint (12) and a second plunging element (30) arranged near the second joint (14), the plunging elements (16, 30) being provided in the form of rolling contact member guides which permit plunging movements along a longitudinal axis (32) and effect the transmission of torque.

2. A propeller shaft assembly according to claim 1 comprising at least two propeller shaft portions (9, 10), at least one intermediate bearing (11), and a third constant velocity fixed joint (13), wherein said third joint (13) is arranged between each adjoining propeller shaft portions (9, 10), and wherein the first and second plunging elements (16, 30) are associated respectively with the respective propeller shaft portions (9, 10) associated with the first and second joints (12, 14).

3. A propeller shaft assembly according to any one of claims 1 or 2 wherein said first and second joints (12, 14) each include an inner part (41) comprising one of the rolling contact member guides of each respective first and second plunging elements (16, 30).

4. A propeller shaft assembly according to any one of claims 1 or 2 wherein the first, second and third joints (12, 13, 14) each comprise:

an outer part (33, 35) with a cavity and two circumferentially distributed sets of outer running grooves (39, 40) which extend from the two open ends (36, 37) of the outer part (33, 55) in opposite directions in an undercut-free way in meridian planes around the longitudinal axis (32) of the outer part (33, 35);

an inner part (41, 56) arranged in the cavity of the outer part (33, 35) and having inner running grooves (42, 43) which are arranged in accordance with the outer running grooves (39, 40) and which, like the outer running grooves (39, 40), start from the same open ends (36, 37) and extend in an undercut-free way in meridian planes around the longitudinal axis (32);

a joint cage (45) arranged between the outer part (33, 55) and the inner part (41, 56) and comprises windows (48) which are open towards the outer running grooves (39,40) and the inner running grooves (42,43); and joint balls (49) of which one each is arranged in a pair of outer and inner running grooves (39, 42; 40, 43).

\* \* \* \* \*